United States Patent [19]

Jackson

[11] Patent Number: 4,631,104
[45] Date of Patent: Dec. 23, 1986

[54] STUD ATTACHMENT METHOD FOR VEHICLE MOLDING
[75] Inventor: Norman C. Jackson, Livonia, Mich.
[73] Assignee: The Standard Products Company, Cleveland, Ohio
[21] Appl. No.: 431,292
[22] Filed: Sep. 30, 1982
[51] Int. Cl.⁴ .............................................. B32B 31/20
[52] U.S. Cl. ................................ 156/293; 156/303.1; 156/309.6; 264/320
[58] Field of Search .................. 156/293, 303.1, 309.6, 156/91, 92; 264/320, 322, 259, 271.1, 23, 274

[56] References Cited
U.S. PATENT DOCUMENTS

| | | | |
|---|---|---|---|
| 2,237,152 | 4/1941 | Larmour | 156/303.1 |
| 2,724,884 | 11/1955 | Jones | |
| 2,809,399 | 10/1957 | Mead et al. | |
| 3,062,140 | 11/1962 | Bishop | |
| 3,577,850 | 5/1971 | Harris et al. | |
| 3,820,221 | 6/1974 | Mercer | |
| 3,872,572 | 3/1975 | Hahn | |
| 3,916,147 | 10/1975 | Mercer | |
| 3,998,824 | 12/1976 | Otsuki et al. | 156/303.1 |
| 4,104,339 | 8/1978 | Fetz et al. | |
| 4,114,976 | 9/1978 | Selvin et al. | |
| 4,136,275 | 1/1979 | McCullough | 156/303.1 |
| 4,143,112 | 3/1979 | Turner | |
| 4,195,219 | 3/1980 | Friese | |

Primary Examiner—Jay H. Woo
Assistant Examiner—Timothy W. Heitbrink
Attorney, Agent, or Firm—Harness, Dickey & Pierce

[57] ABSTRACT

A thermoplastic vehicle trim or molding member includes a preferably elongated slot or cavity in one side. A stud or mounting member having an elongated base is inserted into the cavity, heated and rotated such that the elongated portions of the base locally melt, traverse through, and embed themselves into, the surrounding thermoplastic material. The thermoplastic is allowed to cool to form a secure, interlocking attachment to the molding member.

13 Claims, 5 Drawing Figures

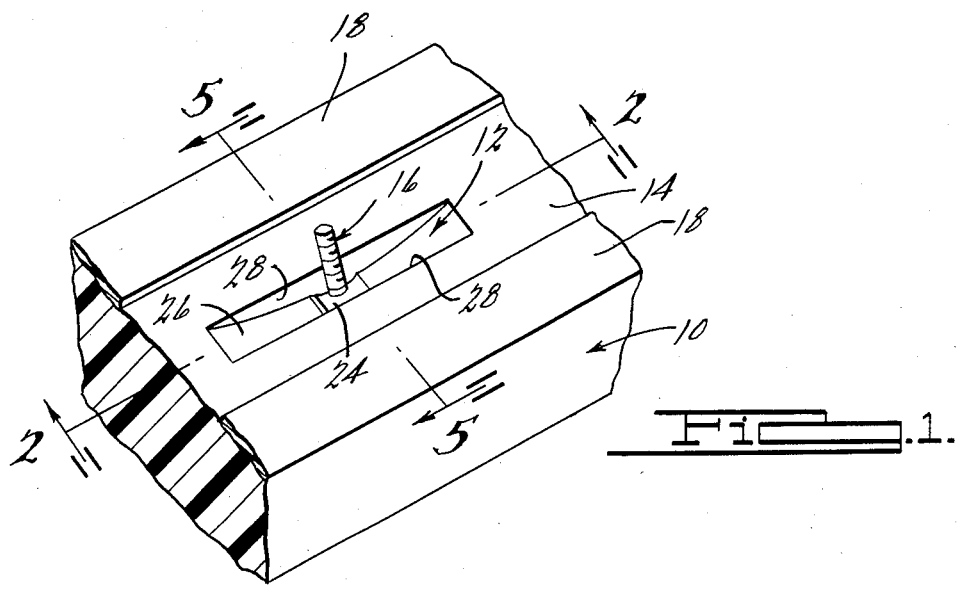
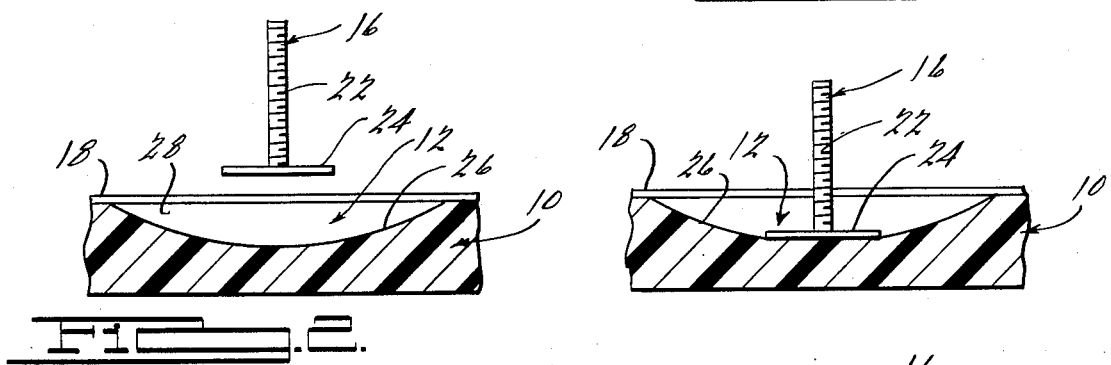
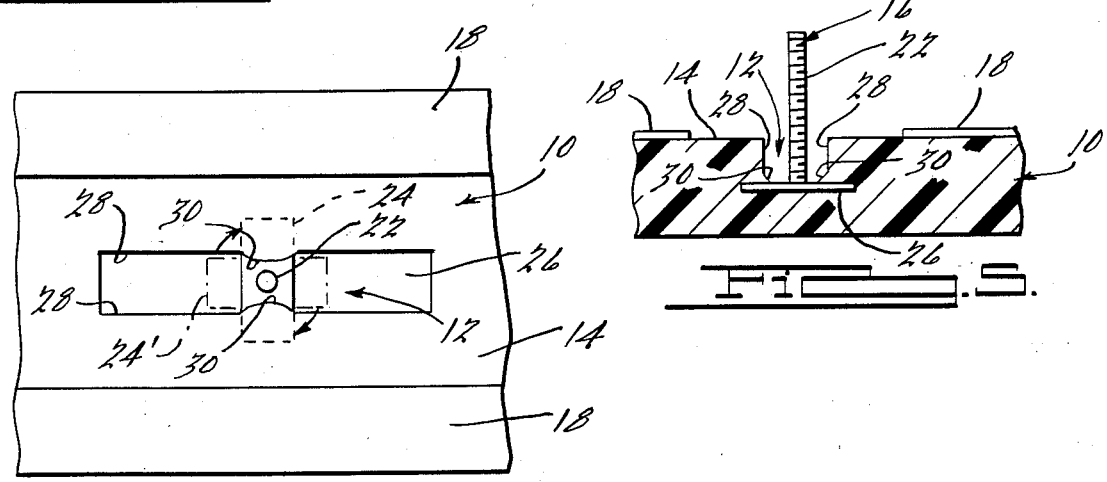

STUD ATTACHMENT METHOD FOR VEHICLE MOLDING

BACKGROUND AND SUMMARY OF THE INVENTION

The invention relates generally to the attachment of one member to another member and more particularly, in the preferred embodiment, to the attachment of a metallic stud or mounting member to a thermoplastic body.

It is frequently desirable to attach a mounting member, such as a threaded fastener for example, to one side of a thermoplastic member such as a vehicle trim or molding member. Frequently such studs or mounting members are molded into a thermoplastic member when the thermoplastic material is formed in a die apparatus. Although generally effective, such a method is costly and necessitates the accurate positioning of the mounting member at the time that the thermoplastic member is manufactured. Thus, once the thermoplastic member is formed, the position of the mounting member is fixed and the assembly may only be used in applications where the location of the mounting points coincide with the fixed positions of the previously molded-in mounting members.

According to the present invention, a mounting member may be secured to a thermoplastic member after the thermoplastic member is formed. A slot or other cavity is cut or otherwise formed in the thermoplastic member at the desired location of attachment of a mounting member. The mounting member includes an elongated, laterally-protruding base portion preferably at one of its ends. The base portion is inserted into the slot or cavity in a non-interfering relationship with the thermoplastic member. The base portion is heated either before or after being inserted into the cavity and rotated or otherwise moved so that its elongated portion locally melts and embeds itself into the thermoplastic material surrounding the slot or cavity. The melted material is cooled and allowed to harden and reform around the base portion in order to form an interlocking engagement between the mounting member and the thermoplastic member.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of a portion of vehicle molding having a mounting stud attached thereto in accordance with thereto.

FIG. 2 is a cross sectional view taken along line 2—2 of FIG. 1, illustrating the mounting stud removed from the vehicle molding and rotated approximately 90 degrees.

FIG. 3 is a view similar to that of FIG. 2, but illustrating the mounting inserted into a cavity in the vehicle molding.

FIG. 4 is a plan view of the vehicle molding of FIG. 1, illustrating the stud member in its rotated and non-rotated positions.

FIG. 5 is a cross sectional view taken along line 5—5 of FIG. 1, illustrating the stud member in its final installed position.

DETAILED DESCRIPTION OF THE PREFERRED EMBODIMENTS

FIGS. 1 through 5 of the drawings depict an exemplary embodiment of the present invention as employed in the attachment of a threaded mounting stud to a vehicle trim or molding member for purposes of illustration only. One skilled in the art will readily recognize from the following discussion that the principles of the invention are equally applicable to other attachments of one member to another and to vehicle molding members and attachment means other than that shown in the drawings.

In FIG. 1, an exemplary vehicle molding member 10 includes a slot or cavity 12 extending partially into the molding member from its side 14 intended to be placed against a vehicle and hereinafter referred to as vehicle side 14. It will, of course, be appreciated that within the broad scope of this invention molding member 10 can be mounted on any suitable supporting structure. However, molding member 10 is especially well adapted to be mounted on an automotive vehicle. A threaded stud or mounting member 16 is received within the slot 12 and securely attached to the molding member 10 so that the molding member may be attached or mounted to a vehicle (not shown in the figures). The molding member 10 may optionally include one or more adhesive strips 18 on its vehicle side 14 for further enhancing its attachment to the vehicle or for assuring a flush engagement between edges of the molding member and the vehicle.

As illustrated in FIGS. 1 and 2, the stud or mounting member 16 preferably includes a longitudinally-extending threaded shaft portion 22 and an elongated, laterally-protruding base portion 24. Stud 16 must be made of a material of a higher melting point than that of molding member 10 such as a ferrous metal, brass aluminum or the like. The length and width dimensions of the slot 12 are at least as large as the corresponding lateral length and width dimensions of the elongated base portion 24. Preferably, the base portion has a generally rectangular, thin plate-like configuration, and the slot 12 is generally rectangular in cross section, having a floor 26 and a pair of spaced vertically-extending side walls 28.

FIGS. 2 through 5 illustrate the attachment of the stud 16 to the molding member 10. The stud 16 is inserted into the slot 12 with its elongated base portion 24 oriented such that the stud 16 does not interfere with the molding member 10. Either before or after being inserted into the slot 12, at least the base portion 24 of the stud 16 is heated to a temperature such that it locally melts a portion of the thermoplastic material when urged or forced into contact with the molding member 10. As shown in FIG. 4, the heated base portion 24 is preferably rotated from its original position, indicated by reference numeral 24', to a position where the elongated protrusions extend into the side walls 28 and are embedded in the thermoplastic material surrounding the slot 12. As the stud 16 is rotated, the heated base portion 24 locally melts and traverses through the thermoplastic material. During such rotation, some portions of the thermoplastic material of the side walls 28 may be deformed or displaced by the movement of the base portion therethrough and form one or more protrusions 30 extending inwardly from the side walls to engage the exposed surface of the base portion 24 in the interior of the slot 12. Such protrusions may further enhance the secure attachment of the stud 16 to the molding member 10. After the stud 16 has been rotated to its final position, as shown in FIG. 4, the previously melted and traversed portions of the thermoplastic material are allowed to cool and reharden to form a secure, interlocking engagement between the elongated base portion 24 of the stud 16.

Preferably, when the stud 16 is first inserted into the slot 12, the elongated base portion 24 is abutted or seated against the floor 26 in order to assure that the base portion 24 is positioned sufficiently deep in the slot to be securely embedded in the thermoplastic material surrounding the slot 12 after being heated and rotated into its final position. The seating of the base portion against the floor 26 also serves a gauging function to assure that the threaded shaft portion 22 extends the desired distance from the vehicle side 14 of the molding member 10. An adhesive material or primer may be applied, if desired, to the elongated base portion 24 prior to its insertion into the slot 12, in order to further enhance its secure attachment to the molding member 10. Such adhesive material or primer may be any of a number of such materials well-known to those skilled in the art.

The foregoing discussion and the accompanying drawings describe and illustrate merely exemplary embodiments of the invention. One skilled in the art will readily recognize that the invention may be modified, varied or changed without departing from the scope or fair meaning of the following claims.

What is claimed is:

1. A method of attaching a first member to a second member, said first member having a laterally-protruding base portion thereon, said method comprising:
    forming a cavity in said second member, said cavity being adapted for receiving said base portion of said first member therein when said base portion is in a first lateral orientation;
    heating at least said base portion of said first member;
    inserting said base portion of said first member into said cavity;
    moving said heated base portion to a second lateral orientation in order to locally melt a portion of the material of said second member surrounding said cavity and to embed said base portion in said material;
    cooling said material of said second member to cause it to reharden around said base portion, thereby forming an interlocking engagement between said first and second members.

2. A method according to claim 1, wherein the step of moving said heated base portion comprises rotating said base member in a generally lateral plane in order to urge said laterally-protruding base portion into said material surrounding said cavity.

3. A method according to claim 2, wherein said base portion is heated prior to being inserted into said cavity.

4. A method according to claim 2, wherein said base portion is heated after being inserted into said cavity but prior to being rotated.

5. A method according to claim 3 or 4, further comprising the step of applying adhesive means to said base portion prior to its insertion into said cavity.

6. A method of attaching a mounting member to a thermoplastic member, said mounting member having a laterally-elongated base portion thereon, said method comprising:
    forming an elongated slot in said thermoplastic member, said slot having lateral length and width dimensions at least as large as the corresponding length and width dimensions of said elongated base portion;
    heating at least the elongated base portion of said mounting member;
    inserting said elongated base portion of said mounting member into said slot in a non-interfering relationship with said thermoplastic member;
    rotating the heated elongated base portion in a generally lateral plane so that said heated elongated base portion locally melts, traverses through, and embeds itself in, a portion of the thermoplastic member surrounding said slot;
    cooling said portion of said thermoplastic member to reharden the thermoplastic material around said elongated base portion and to form an interlocking engagement between said mounting member and said thermoplastic member.

7. A method according to claim 6, further comprising the step of applying adhesive means to said elongated base portion prior to its insertion into said slot.

8. A method according to claim 6, wherein said elongated base portion is located substantially at an end portion of said mounting member, said step of inserting said elongated portion into said slot including seating said elongated base portion against the floor of said slot.

9. A method according to claim 8, wherein said elongated base portion is rotated approximately 90° from its orientation when inserted into said slot.

10. A method according to claim 9, wherein said elongated base portion is heated prior to being inserted into said slot.

11. A method according to claim 10, further comprising the step of applying adhesive means to said elongated base portion prior to its insertion into said slot.

12. A method according to claim 9, wherein said elongated base portion is heated after being inserted into said slot but prior to being rotated.

13. A method according to claim 12, further comprising the step of applying adhesive means to said elongated base portion prior to its insertion into said slot.

* * * * *